Patented Nov. 3, 1936

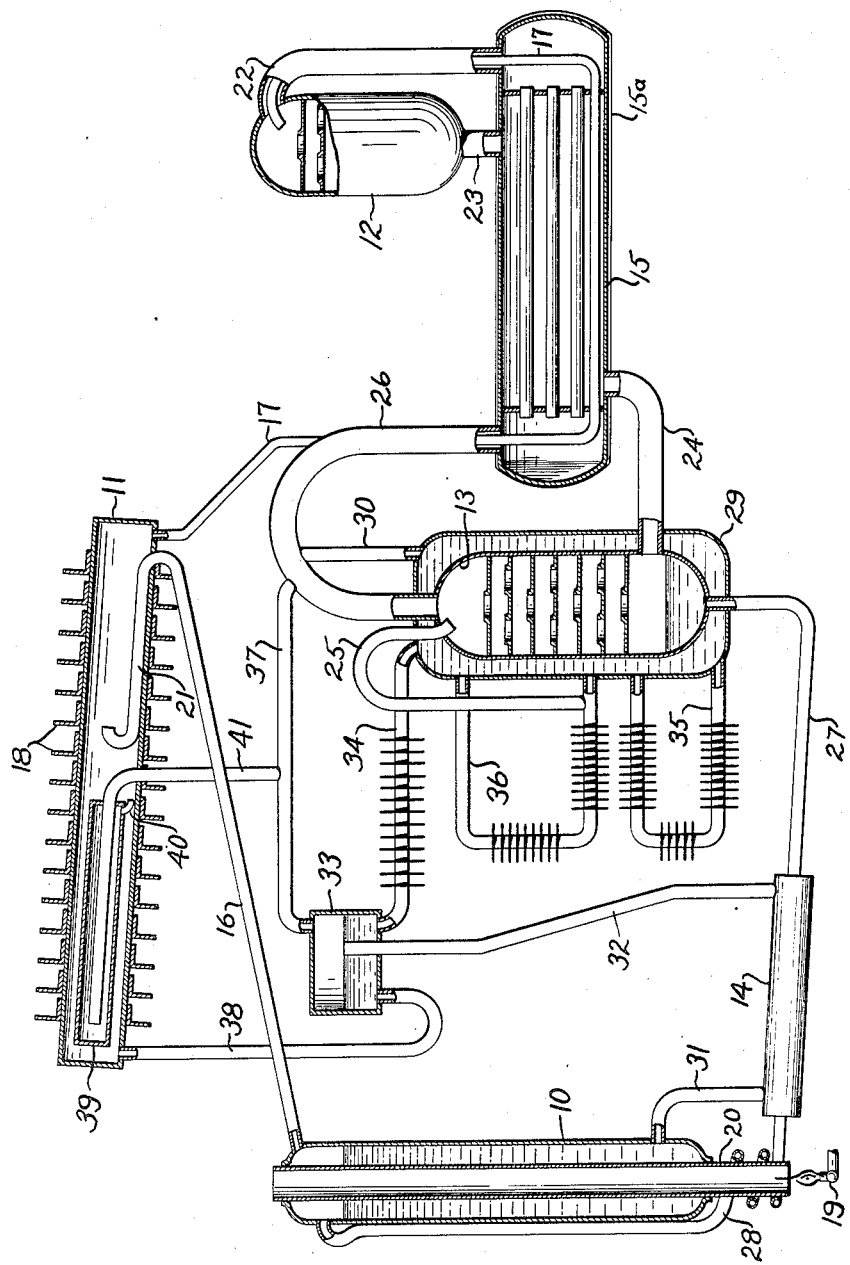

2,059,841

UNITED STATES PATENT OFFICE 2,059,841

REFRIGERATION

Sigurd Mattias Bäckström, Stockholm, Sweden, assignor, by mesne assignments, to Servel, Inc., Dover, Del., a corporation of Delaware Application December 22, 1933, Serial No. 703,530
In Germany December 30, 1932

25 Claims. (Cl. 62—119.5)

My invention relates to refrigeration systems in which refrigerant fluid is evaporated by diffusion into an auxiliary pressure equalizing gas. A system of this type is disclosed in Patent 1,609,334 to von Platen et al.

In such systems, especially those operating at high internal pressures, and depending on the kind of metal of which the apparatus is constructed, there may occur a gradual diffusion of the auxiliary gas through one or more walls or wall parts of the apparatus, particularly those walls which are normally dry, that is, not wet by liquid refrigerant or absorption solution. The diffusion, although very slow, is more pronounced in the higher temperature portions of the system, the walls of which are not protected by liquid against diffusion of the auxiliary gas, as, for instance, in the absorber, or a storage chamber for auxiliary gas connected to the condenser as disclosed in Patent 1,822,224 to Knight. Diffusion of the auxiliary pressure equalizing gas out of the system over a long period of time may result in a decrease of pressure in the system and change in the ratio of the fluid agents in the system which results in a change in refrigeration temperatures.

In accordance with my invention I provide the normally dry surface portions, and especially those of the higher temperature portions of the system, with a layer which counteracts or protects against diffusion of the gas out of the system. For instance, systems utilizing ammonia as the refrigerant, water as the absorption liquid, and hydrogen as the auxiliary pressure equalizing gas usually comprise apparatus formed of iron or steel. In accordance with my invention I can provide the iron walls of the apparatus parts which are normally dry with a thin exterior plating of a metal impermeable to the hydrogen such as tin or copper. For manufacturing reasons it is frequently preferable to plate the entire apparatus. It will be understood that if other fluids than those mentioned are used in the system, a suitable material must be chosen for the protective layer. My invention is also carried out by surrounding the parts subject to leakage by diffusion with a layer of liquid in a jacket or other receptacle that is vented into the system for return of gas which passes into the liquid by diffusion. This embodiment of my invention is particularly advantageous for the parts of the system as the refrigerant, water as the absorption liquid, supplied as the diffusion protecting layer may be readily utilized for removal of heat from the element to be cooled. The combination diffusion protecting and heat absorbing liquid jacket is particularly suitable for the absorber in a system cooled by air.

My invention will be more fully understood by reference to the following description taken in connection with the accompanying drawing in which the single figure shows schematically an air cooled refrigeration system embodying one form of my invention.

Referring to the drawing, the refrigeration system illustrated is generally of the type disclosed in the above mentioned patent to von Platen et al. and comprises essentially a generator 10, a condenser 11, an evaporator 12, and an absorber 13. The generator 10 and absorber 13 are interconnected through a liquid heat exchanger 14 for circulation of absorption solution therebetween as hereinafter described. The evaporator 12 and absorber 13 are interconnected through a gas heat exchanger 15 for circulation of gas therebetween as hereinafter described. The condenser 11 is connected to receive vapor from the generator 10 through a conduit 16 and deliver liquid condensate to the evaporator 12 through a conduit 17. The system may contain a solution of refrigerant, such as ammonia, in an absorption liquid, such as water, and an auxiliary pressure equalizing gas, such as hydrogen. It will be understood, however, that the fluid agents named are only for the purpose of this description and other combinations of fluids may be utilized.

The condenser 11 is represented by a horizontally elongated closed vessel provided with fins 18 which afford an extensive surface area for cooling of the condenser by air. The absorber 13 is cooled in a novel manner hereinafter described and the generator 10 is heated by any suitable means such as a gas burner 19 directing a gas flame into a flue 20 which latter extends vertically through the generator as shown. The system is charged by introducing a suitable quantity of water solution of ammonia through a charging valve, not shown, and also introducing pure hydrogen gas at a pressure corresponding to that required for complete condensation of ammonia in the condenser at a predetermined temperature. A method of charging is fully set forth in Patents 1,799,201 to von Platen et al. and 1,830,894 to Ullstrand et al.

In operation, ammonia is distilled from solution in the generator 10 into the evaporator 12. Ammonia vapor is expelled from solution in the generator 10 by heat and passes through conduit 16 into the condenser 11. Due to cooling in the latter, the ammonia condenses to liquid which drains through conduit 17 into the upper part of the evaporator 12. The vapor conduit 16 preferably extends for a distance along the lower wall within the condenser 11 before discharge into the latter, forming a rectifier section 21. The latter is cooled by condensate flowing along the bottom of the condenser, causing rectification of the distillation vapor, that is, entrained water vapor condenses out of the ammonia and drains back to the generator 10 through conduit 16 which is provided with the necessary slope. Although not shown, the rectifier section 21 may be provided with suitable baffles or weirs for retaining a larger quantity of cooling liquid in contact therewith.

Liquid ammonia entering the evaporator 12 flows downwardly over suitable baffle plates therein thus distributing the liquid over an extensive surface area for evaporation by diffusion into hydrogen gas which enters the evaporator through conduit 22. The latent heat of vaporization is supplied by the liquid ammonia which is cooled to a relatively low temperature thereby producing a refrigeration effect as well known in the art. The resulting gas mixture or "rich" gas flows from the evaporator 12 through conduit 23, gas heat exchanger 15, and conduit 24 to the lower part of the absorber 13. In the latter, ammonia vapor is absorbed out of the rich gas into residue or weak absorption solution which enters the absorber through conduit 25. The resulting "weak" gas returns to the evaporator 12 through conduit 26, gas heat exchanger 15 and conduit 22. Circulation of gas between the evaporator 12 and absorber 13 occurs automatically due to the difference in specific weights of the columns of weak and rich gas.

Enriched absorption solution flows from the lower part of the absorber 13 through conduit 27, liquid heat exchanger 14, and is raised through a thermosyphon conduit 28 to a higher level in the generator 10 in a manner well known in the art. Flow of the weak solution from the generator 10 to the absorber 13 is hereinafter described.

The apparatus described above is preferably constructed of iron or steel for the reason that this metal does not react chemically with the fluids in the system, especially the ammonia. As previously mentioned, a certain small amount of diffusion of the hydrogen gas may occur through the steel walls of the apparatus which are not wet by liquid ammonia or absorption solution especially when the walls of the apparatus are of a thickness to withstand the maximum internal pressure but not of any greater thickness than necessary for that purpose. The dry walls of the apparatus which are at a higher temperature are subject to the greater amount of diffusion. For instance, the absorber from which the heat of absorption must be dissipated is particularly subject to slow escape of hydrogen by diffusion through its dry walls. In accordance with my invention I not only prevent diffusion of hydrogen from the absorber out of the system but also provide for transferring the heat of absorption to ambient air, wherefore my invention is particularly suitable for absorption refrigeration systems cooled by air.

Referring to the drawing, I surround the absorber 13 with a jacket 29 for the purpose of retaining a protective layer of liquid around the absorber. This jacket is vented through conduit 30 to conduit 26 which is part of the gas circuit, whereby any hydrogen which diffuses from the absorber into the liquid layer returns to its proper circuit in the system. I advantageously utilize weak absorption solution flowing from the generator to the absorber to fill the jacket 29 and establish the protective layer of liquid around the absorber. From the generator 10, weak absorption solution flows through conduit 31, liquid heat exchanger 14, and conduit 32 into an intermediate vessel 33 which is located at the level of liquid in the generator and above the entrance for liquid to the absorber. From the vessel 33 the weak solution flows through conduit 34 into the diffusion prevention jacket 29. The conduit 34 is preferably provided with heat radiation fins for further cooling of the weak solution after passage through the liquid heat exchanger 14 and before entrance into the jacket 29. The latter may be provided with a plurality of finned pipe loops such as the looped conduits 35 and 36. Opposite ends of each of the pipe loops 35 and 36 are connected to the jacket 29 at different levels wherefore a natural circulation of solution is set up through these loops during operation of the system. Liquid in the jacket 29, which receives the heat of absorption from the absorber 13, is of less specific gravity than liquid in the pipe loops 35 and 36, which are cooled by thermal transfer to ambient air, so that there results a downward flow of liquid through the pipe loops and a corresponding upward flow of warmer liquid in the jacket. Weak solution may be tapped into the absorber 13 from the lower end of one of these pipe loops as through conduit 25 which is connected from the lower end of loop 36 to the top of the absorber 13. Conduit 25 has an upward loop of sufficient height that delivery of weak solution into the absorber occurs by overflow from the liquid level in the generator and intermediate vessel 33 as slightly modified by the liquid flow resistance of the connecting conduits. The pressures in the absorber 13 and vessel 33 are equalized by providing a pressure equalizing conduit 37 connected from the upper part of vessel 33 to conduit 26. The condenser 11 is vented for return of hydrogen therefrom to the gas circuit by a conduit 38 connected from the higher end of the condenser to the lower part of vessel 33 below the liquid level in the latter. Accumulation of hydrogen released in the condenser creates a pressure which is periodically relieved through the short liquid column in conduit 38 into vessel 33 and the pressure equalizing conduit 37 to conduit 26 in the hydrogen circuit.

The gas heat exchanger 15 is protected against diffusion therefrom of hydrogen by an external plating or layer of tin 15a. Any other suitable material that is impermeable to the auxiliary gas, as, for instance, copper, may be used for the protective coating. Other parts of the apparatus subject to diffusion may be protected in a like manner if so desired. It is often more expedient from a manufacturing standpoint to plate the entire apparatus as a unit. I thus form the apparatus, especially those parts subject to gas diffusion, of a bimetallic casing, one metal being chemically inert to the fluid agents and of sufficient strength to withstand internal pressure, and the other metal being impermeable to the gaseous agent.

It has previously been mentioned that the hydrogen or other auxiliary pressure equalizing gas is charged into the system at a pressure corresponding to that at which condensation of ammonia occurs in the condenser at a predetermined temperature. In a system cooled by air, as contemplated by my invention, the condenser temperature varies with the temperature of the surrounding atmosphere and, since the latter is subject to considerable variation, the temperature may rise sufficiently that no condensation of the ammonia occurs in the condenser. As disclosed in the above mentioned Patent 1,822,224 to Knight, a storage vessel, commonly referred to as a pressure vessel, may be provided for storing an excess quantity of hydrogen or other auxiliary pressure equalizing gas in communication with the gas circuit between the absorber and evaporator with provision for displacing the excess gas into the circuit upon increase in room temperature whereby the gas pressure is increased sufficiently for condensation of refrigerant in the condenser at the elevated temperature. The pressure vessel is advantageously connected in the vent line from the condenser to the gas circuit whereby auxiliary gas is displaced by refrigerant vapor that is not condensed upon increase in temperature. Such a pressure vessel, having an extensive dry surface, is subject to permeation by the gas, allowing escape of the latter from the system as set forth above. In accordance with my invention, I may locate such a pressure vessel within a portion of the refrigeration system having walls protected against gas diffusion therethrough as, for instance, the condenser. The walls of the latter being cooled by transfer of heat through the finned surface to ambient air are wet due to condensation thereon of the ammonia or other refrigerant. Referring to the drawing, I provide a pressure vessel 39 within the condenser 11 and in communication with the latter through a short conduit 40 at one end of the vessel 39. The opposite end of the latter is connected to the hydrogen or other auxiliary gas circuit through conduit 41 and pressure equalizing conduit 37. Upon increase in temperature of the condenser 11, uncondensed ammonia vapor enters the pressure vessel 39 through conduit 40 and displaces the excess hydrogen through conduit 41 and the pressure equalizing conduit 37 into the gas circuit between the evaporator 12 and absorber 13. Introduction of the excess gas increases the volume of gas in the circuit and thus increases the pressure whereby the total pressure in the system rises to such a value that condensation of ammonia is again complete at the elevated temperature. Instead of connecting conduit 41 to the pressure equalizing conduit 37 which is connected to the weak gas side of the hydrogen circuit, the connection may be made to the strong gas side of the circuit, for instance, by connecting conduit 41 to conduit 24. This would eliminate any likelihood of introducing ammonia vapor into the weak gas flowing to the evaporator. Upon decrease in room temperature, ammonia will condense at a lower pressure wherefore the ammonia vapor in the pressure vessel 39 condenses and is replaced by hydrogen from the gas circuit through conduits 37 and 41. Liquid ammonia drains into the condenser from the pressure vessel 39 through conduit 40 which is advantageously arranged for that purpose as shown. Hydrogen or other pressure equalizing gas which may diffuse through the walls of the pressure vessel 39 escapes into the condenser 11 from where it is vented, together with hydrogen liberated in the condenser, through the condenser vent 38 as previously described.

It will be apparent to those skilled in the art that various other changes may be made in the construction and arrangement without departing from the spirit of the invention, and therefore the invention is not limited to that which is described in the specification and shown in the drawing, but only as indicated in the following claims.

What is claimed is:

1. In refrigeration apparatus containing refrigerant fluid, absorption liquid, and auxiliary pressure equalizing gas, means for maintaining a layer of absorption liquid about a part of the apparatus of which the surfaces are normally dry, and means for cooling the liquid forming said layer.

2. In refrigeration apparatus containing refrigerant fluid, absorption liquid, and auxiliary pressure equalizing gas, means for maintaining a layer of absorption liquid about a part of the apparatus of which the surfaces are normally dry, a vent for gas from said means to the system, and means for circulating liquid from said layer in thermal transfer with ambient air.

3. A refrigeration system comprising a generator, a condenser, an evaporator, and an absorber interconnected for circulation of refrigerant fluid, said evaporator and absorber being interconnected for circulation of auxiliary gas therebetween, and a circuit for absorption liquid between said generator and absorber including liquid retaining means around the absorber.

4. A refrigeration system comprising a generator, a condenser, an evaporator, and an absorber interconnected for circulation of refrigerant fluid, said evaporator and absorber being interconnected for circulation of auxiliary gas therebetween, a jacket around said absorber, and a circuit for absorption liquid between said generator and absorber including said jacket in the path of flow of liquid toward the absorber.

5. A refrigeration system comprising a generator, a condenser, an evaporator, and an absorber interconnected for circulation of refrigerant fluid, said evaporator and absorber being interconnected for circulation of auxiliary gas therebetween, a jacket around said absorber, a circuit for absorption liquid between said generator and absorber including said jacket in the path of flow of liquid toward the absorber, and means for cooling liquid in said jacket comprising a finned pipe loop connected to the jacket with the ends at different levels.

6. In a method of refrigeration with apparatus in which refrigerant fluid is distilled from solution and evaporated into an auxiliary gas, that improvement which comprises conducting residue weak solution in a path encompassing a part of the apparatus of which the surfaces are normally dry and contacted by the auxiliary gas.

7. In a method of refrigeration with apparatus in which refrigerant fluid is distilled from solution and evaporated into an auxiliary gas, that improvement which comprises cooling residue weak solution and conducting the cooled solution in a path encompassing a heat rejecting part of the apparatus of which the surfaces are normally dry and contacted by the auxiliary gas.

8. In a method of refrigeration with a system in which refrigerant fluid is distilled from solution, evaporated into an auxiliary gas, and again absorbed in residue weak solution, that improvement which comprises transferring heat of absorption to ambient air through a path including residue weak solution.

9. In a method of refrigeration with a system in which refrigerant fluid is distilled from solution, evaporated into an auxiliary gas, and again absorbed into residue solution, that improvement which comprises cooling residue weak solution by heat transfer to ambient air, flowing the cooled solution in a path encompassing a portion of the system subject to diffusion therefrom of auxiliary gas, and transferring heat of absorption to the cooled solution.

10. In a refrigeration system containing refrigerant fluid and having a circuit for auxiliary pressure equalizing gas, a storage vessel for excess auxiliary gas communicating with said circuit and located within a portion of the system having walls protected by liquid refrigerant against gas diffusion.

11. In a refrigeration system containing refrigerant fluid and auxiliary pressure equalizing gas, a condenser for the refrigerant, and a storage compartment for excess auxiliary gas communicating with said system and located within said condenser.

12. In a refrigeration system containing refrigerant fluid and having a circuit for auxiliary pressure equalizing gas, a condenser for the refrigerant, and a storage vessel for excess auxiliary gas communicating with said circuit and located within said condenser.

13. In a method of refrigeration with a system containing refrigerant fluid and auxiliary pressure equalizing gas, that improvement which comprises storing excess auxiliary gas, condensing refrigerant to liquid on a surface surrounding the stored gas, and circulating the excess gas in the system upon increase of pressure therein.

14. In a method of refrigeration with a system containing refrigerant fluid and auxiliary pressure equalizing gas, that improvement which comprises maintaining an excess quantity of auxiliary gas and maintaining a layer of liquid around said excess quantity of gas.

15. Refrigeration apparatus containing refrigerant fluid, absorption liquid, and auxiliary pressure equalizing gas having a bi-metallic casing of which an inner layer of metal is chemically inert to said fluid agents and of sufficient strength to withstand internal pressure and an outer layer of metal is impermeable to the auxiliary gas.

16. Refrigeration apparatus containing refrigerant fluid, absorption liquid, and auxiliary pressure equalizing gas having a casing of metal which is chemically inert to said fluid agents and sufficiently strong to withstand internal pressure and a diffusion prevention coating on the outside of said casing comprising a metal impermeable to the auxiliary gas.

17. Refrigeration apparatus containing a water solution of ammonia and hydrogen comprising a casing of iron sufficiently strong to withstand internal pressure and a diffusion prevention coating on the outside of said casing comprising a metal impermeable to hydrogen.

18. In a refrigerating system, a generator, a condenser, an evaporator, an absorber, members connecting the aforesaid elements to form a circuit for flow of refrigerant through the generator, condenser, evaporator and absorber, a circuit for flow of auxiliary gas through the evaporator and absorber, and a circuit for flow of absorption liquid through the generator and absorber, and means to maintain a layer of absorption liquid about a major portion of one or more parts of the apparatus in the circuit for gas to prevent diffusion of auxiliary gas therethrough.

19. In a refrigerating system, members providing a circuit for auxiliary gas, a pressure vessel connected to said circuit, and means for condensing fluid in the system on a wall encompassing said vessel.

20. In a refrigerating system, members providing a circuit for auxiliary gas, and a storage vessel for excess auxiliary gas communicating with said circuit, said storage vessel being located within another vessel of said system.

21. In a method of refrigeration with a system containing refrigerant fluid and auxiliary pressure equalizing gas, the improvement which consists in storing excess auxiliary gas within a portion of the system, circulating the excess gas in the system upon rise of pressure therein, and preventing diffusion of gas from said portion by encompassing said portion with fluid of the system.

22. In a method of refrigeration with a system containing refrigerant fluid and auxiliary pressure equalizing gas, the improvement which consists in storing excess auxiliary gas within a portion of the system, circulating the excess gas in the system upon rise of pressure therein, and preventing diffusion of gas from said portion by encompassing said portion with liquid of the system.

23. In a method of refrigeration with a system containing refrigerant fluid and auxiliary pressure equalizing gas, the improvement which consists in storing excess auxiliary gas within a portion of the system, circulating the excess gas in the system upon rise of pressure therein, and preventing diffusion of gas from said portion by encompassing said portion with liquid condensed in the system.

24. In the art of refrigeration with a unit containing an auxiliary fluid into which a refrigerant fluid diffuses, the improvement which consists in plating part or the whole of the unit exteriorly with a metal particularly adapted to resist passage of the auxiliary fluid through the wall of the unit.

25. Refrigeration apparatus containing a water solution of ammonia and hydrogen and comprising a casing of iron sufficiently strong to withstand internal pressure and a coating of tin on the outside of said casing to prevent diffusion of hydrogen therethrough.

SIGURD MATTIAS BÄCKSTRÖM.